United States Patent Office 3,335,577
Patented Aug. 15, 1967

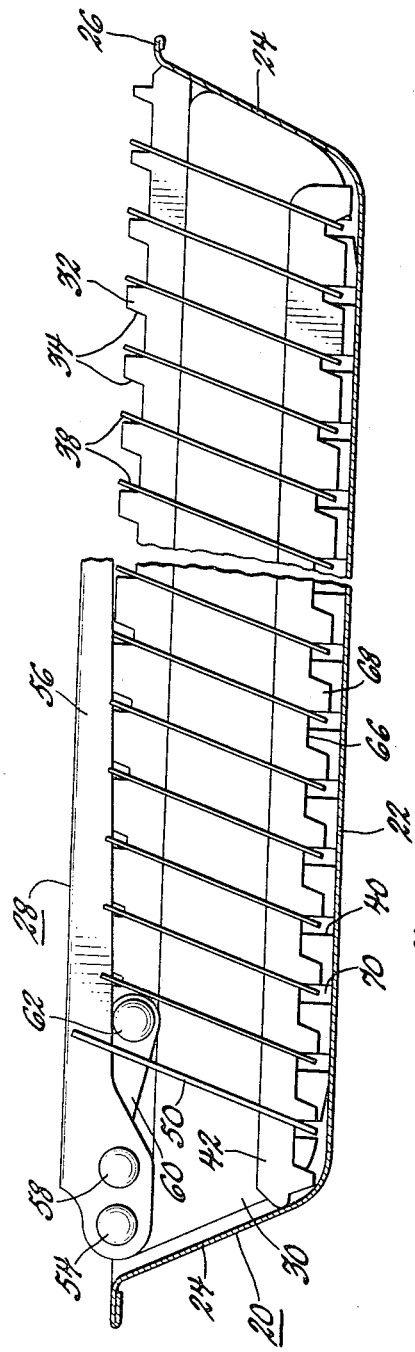

3,335,577
FREEZING TRAY
Robert M. Strahan, Vandalia, and Joe P. Pietrzak, Dayton, Ohio, assignors to General Motors Corporation, Detroit, Mich., a corporation of Delaware
Filed Mar. 28, 1966, Ser. No. 538,012
9 Claims. (Cl. 62—320)

ABSTRACT OF THE DISCLOSURE

In the preferred form, on the opposite sides of the upper and lower longitudinal walls the transverse walls are provided with aligned slots with the end walls having slots which extend diagonally inwardly and the walls in between the end walls have slots with V-shaped bottoms. A pair of breaker bars, each rectangular in cross section extend through the slots and are tilted inwardly by the diagonal slots in the end transverse walls. These bars extend through the ice forming compartments adjacent the bottom of the tray and grid and have notches in their lower surface which progressively increase in width in the direction opposite the progressive increase in width of the notches in the upper longitudinal wall.

---

This invention pertains to freezing trays and more particularly to a freezing tray which will provide cracked ice or cracked frozen liquid.

The freezing trays available commercially provide frozen cubes of comparative large size. Many people desire to have cracked ice or cracked frozen liquid. Although small, mechanical, electrically powered ice cube crushers are available, they are an added expense.

It is an object of this invention to arrange an ejector grid of a freezing tray with breaker bars having a lost motion connection with the transverse movable walls of the grid to progressively break from one end to the other of the trays all of the frozen liquid or ice into small pieces during the ejection operation.

It is another object of this invention to arrange the ejector grid of a freezing tray with breaker bars set at an angle and having teeth which assist in breaking the frozen liquid or ice into small pieces during the ejection operation.

These and other objects are attained in the form shown in the drawings in which the grid has an upper longitudinal movable bar on top of the lower longitudinal partition wall. This upper bar is provided with notches of progressively increasing width from the front to the rear thereof. These notches are comparatively close together and support the upper ends of a series of substantially identical closely spaced transverse walls each having central upright aligned slots through which extend the upper bar and the lower wall. According to my invention, each of the transverse walls on opposite sides of the longitudinal wall have aligned slots therein extending diagonally inwardly. Two or more breaker bars each rectangular in cross section are tilted inwardly and extend through the aligned slots on opposite sides of the longitudinal wall substantially beneath the normal liquid level and adjacent the bottom of the tray. These breaker bars have slots or notches therein which engage the transverse partition walls at the bottoms of the slots to form lost motion connections therebetween. These notches on the bottom of he breaker bars progressively increase in width in the direction opposite the progressive increase in the width of the notches in the upper longitudinal bar. Between the notches on the lower face of the breaker bars are downwardly facing teeth which assist in the breaking and cracking of the ice when the upper longitudinally movable bar is moved forward to progressively pull forwardly the tops of the transverse partition walls. During this movement the breaker bars are also moved a very short distance forwardly and upwardly. This will cause a progressive cracking of the ice or frozen liquid, freeing it from the tray and grid.

Further objects and advantages of the present invention will be apparent from the following description, reference being had to the accompanying drawings wherein a preferred embodiment of the present invention is clearly shown.

In the drawings:

FIGURE 1 is a sectional view taken along the line 1—1 of FIGURE 3 illustrating a freezing tray having an ice cracking ejector grid embodying one form of my invention;

FIGURE 2 is a vertical sectional view taken along the line 2—2 of FIGURE 3;

FIGURE 3 is a transverse sectional view taken along the line 3—3 of FIGURE 2; and FIGURE 4 is a fragmentary transverse sectional view taken along the line 4—4 of FIGURE 2.

Referring now to the drawings, there is shown a freezing tray including a shallow elongated container pan 20 having a bottom 22 with flaring sides 24 and an upper rim 26. The container pan 20 preferably has its interior coated with polytetrafluoroethylene. In addition to this, the pan 20 is anodized and coated with the coating material disclosed in Patent 3,016,719 issued Jan. 16, 1962.

Within the pan 20 is an ejector grid 28 including a lower longitudinal partition wall portion 30 resting upon the bottom 22 of the tray 20. The upper portion of the longitudinal partition wall is provided by a longitudinally movable rectangular bar 32 which rides on the top of the lower portion 30 and is longitudinally movable relative thereto. This bar 32 is provided with a plurality of closely spaced upwardly facing notches or slots 34 in its upper surface which progressively increase in width from front to rear. The upper and lower longitudinal wall portions 30 and 32 extend through an irregular central vertical slot 36 in each of the transverse partition walls 38. The lower portions of the partition walls 38 at the bottom of the slots 36 have webs received in the closely spaced downwardly facing notches 40 upon the bottom of the lower longitudinal wall portions 30. These slots 40 are equal in width and are equally spaced. Like the notches 34 and the transverse walls 38, the notches 40 are much more closely spaced than in conventional freezing trays and grids to provide thin ice forming compartments on both sides of the longitudinal wall portion 30.

To break and crack ice or frozen liquid in the tray, I add to the grid 28 two longitudinally extending breaker bars 42 and 44 which tilt inwardly at a small angle. These breaker bars 42 and 44 extend through peculiarly shaped slots 46 and 48 in the transverse partition walls 38. Each of these slots 46 and 48 has an upper notch 80 extending upwardly and outwardly through which the bars 42 and 44 are inserted. The front partition wall 50 is thicker and larger than the remaining partition wall. It has two slots 52 located on opposite sides of the lower longitudinal wall portion 30 which are tilted toward each other at a small angle. These slots 52 act to hold the breaker bars 42 and 44 in the proper location within the V-shaped lower portions 82 of the slots 46 and 48. This small angle of the breaker bars 42 and 44 applies a lateral shearing action to the ice and assists both in the breaking and releasing of the ice or frozen liquid. The notches 34 of the bar 32 hold the transverse walls 38 sufficiently high above the bottom 22 of the tray 20 providing sufficient clearance to prevent any scraping of the bottom.

To eject the ice or frozen liquid and to crack the ice or frozen liquid, the lower longitudinal partition wall portion 30 at the front end is riveted by a rivet 54 to a long lever 56. This lever 56 is connected by a rivet 58, a link 60 and a third rivet 62 to the upper bar 32. When it is desired to eject the ice or frozen liquid and to crush the ice or frozen liquid the lever 56 is lifted to pivot it about the rivet or pivot pin 54 to cause the link 60 to pull forwardly the bar 32 relative to the lower portion 30 and the tray 20. The forward movement of the bar 32 through its notches 34 first engages and moves forward the top walls of all the transverse partition walls. This movement takes place progressively by reason of the progressive increase in width of the slots from the front to the rear. The front transverse partition wall 50 is the first to move forwardly after which the remaining partition walls 32 are progressively moved forward, beginning with the wall nearest the rivet 62.

The breaker bars 42 and 44 have slots or notches 66 which progressively increase in width from the rear to the front in exactly the opposite direction from that of the notches 34 in the upper bar 32. These notches 66 provide lost motion connections between it and the transverse partition walls 50 and 32, assisting in their spacing. The teeth 68 located between the notches 66 assist in breaking the ice between the partition walls while the bars 42 and 44 in general are moved forwardly and upwardly and diagonally inwardly a short distance to assist in the cracking of ice or frozen liquid whenever the lever 56 is lifted to pull forwardly the upper bar 32. The upward movement of the bars 42 and 44 is caused by the camming action resulting from the forward movement of its front end against the front wall of the pan 20. The diagonal slots 46, 48 and 52 guide the bars 42, 44 diagonally inwardly. The transverse walls 38 are cut off above the bottom of the lower longitudinal wall portion 30 short of the bottom of the tray 22 to provide a clearance space 70 between them and the bottom 22 of the tray so as to prevent the rubbing or scraping of the coating upon the tray 26. The grid 28 including the breaker bars 42 and 44 preferably is anodized and coated with the coating material disclosed in Patent 3,016,719 issued Jan. 16, 1962. The progressive forward movement of the tops of the partition walls 38 and 50 frees the ice or frozen liquid from the grid 28 and the pan 20 so that the assistance of the diagonal movement of the breaker bars 42, 44 cracking is accomplished whenever the ejector lever 56 is properly operated. This operation frees the ice or frozen liquid from the transverse walls 38 as well as from the longitudinal wall portions 30 and 32. The close spacing of the transverse partition walls 38 as well as the tilted converging angular position and the forward and upward and diagonal inward movement of the breaker bars 42 and 44 assisted by the teeth 68, cracks the ice or frozen liquid during this manipulation. The broken and cracked ice or frozen liquid may either be removed while the grid is in the pan by inverting it over a bucket, or the grid 28 may be removed from the pan to leave the cracked ice or frozen liquid in the tray.

While the embodiment of the present invention as herein disclosed, constitutes a preferred form, it is to be understood that other forms might be adopted.

What is claimed is as follows:

1. A freezing tray including a container pan adapted to contain liquid to be frozen, a grid for dividing the interior of the pan into a plurality of frozen liquid forming compartments, said grid comprising a longitudinal wall and closely spaced movable transverse walls, and bars extending longitudinally beneath said liquid through the lower portion of each of said frozen liquid forming compartments and provided with teeth between the transverse walls for cracking the frozen liquid, said teeth extending downwardly substantially as far as the bottom edges of said transverse walls.

2. A freezing tray as defined in claim 1 in which the bars are rectangular in cross section and have their sides at a substantial angle to the vertical to provide a lateral shearing action upon the frozen liquid.

3. A freezing tray as defined in claim 1 in which the bars have notches between the teeth interfitting with the transverse walls, said notches being substantially wider than the thickness of said transverse walls to provide a substantial lost motion connection with said transverse walls.

4. A freezing tray as defined in claim 1 in which the bars have notches between the teeth interfitting with the transverse walls, said notches being of progressively increasing width from one end of the bars to the other and providing a progressively increasing lost motion connection with the transverse walls.

5. A freezing tray as defined in claim 1 in which the longitudinal wall has upper and lower portions longitudinally movable relative to each other, said upper portion having notches increasing in width progressively in one direction interfitting with said transverse walls and said bars having notches in between the teeth progressively increasing in width in the opposite direction interfitting with said transverse walls.

6. A freezing tray as defined in claim 1 in which the longitudinal wall has upper and lower portions longitudinally movable relative to each other, said upper portion having notches increasing in width progressively in one direction interfitting with said transverse walls and said bars having notches in between the teeth progressively increasing in width in the opposite direction interfitting with said transverse walls, the notches in said upper portion facing upwardly and the notches in said bars facing downwardly.

7. A freezing tray as defined in claim 1 in which the transverse walls intermediate the ends of the grid have slots adjacent their lower edges, said slots in said transverse walls being provided with V-shaped lower portions through which extend the portions of the bars between the teeth thereof.

8. A freezing tray as defined in claim 1 in which the transverse walls intermediate the ends of the grid have slots adjacent their lower edges, said slots in said transverse walls being provided with V-shaped lower portions through which extend the portions of the bars between the teeth thereof, the transverse walls at the opposite ends of the grid being provided with narrow rectangularly shaped slots extending at an angle to the vertical which receive and hold at said angle the ends of said bars, said bars being slightly thinner than the width of said slots.

9. A freezing tray as defined in claim 1 in which the transverse walls intermediate the ends of the grid have slots adjacent their lower edges, said slots in said transverse walls being provided with V-shaped lower portions through which extend the portions of the bars between the teeth thereof, the transverse walls at the opposite ends of the grid being provided with narrow rectangularly shaped slots extending at an angle to the vertical which receive and hold at said angle the ends of said bars, said bars being slightly thinner than the width of said slots, said slots in said transverse walls having notches extending upwardly from said V-shaped lower portions to provide sufficient height for the toothed portions of said bars so that said toothed portions can pass through said notches.

References Cited

UNITED STATES PATENTS

| | | | |
|---|---|---|---|
| 2,690,651 | 10/1954 | Grinnell | 62—320 |
| 2,783,619 | 3/1957 | Yates | 62—320 |
| 2,849,869 | 9/1958 | Baillif et al. | 249—70 |
| 2,862,370 | 12/1958 | Frei | 249—72 |

ROBERT A. O'LEARY, *Primary Examiner.*

W. E. WAYNER, *Assistant Examiner.*